Patented Feb. 17, 1925.

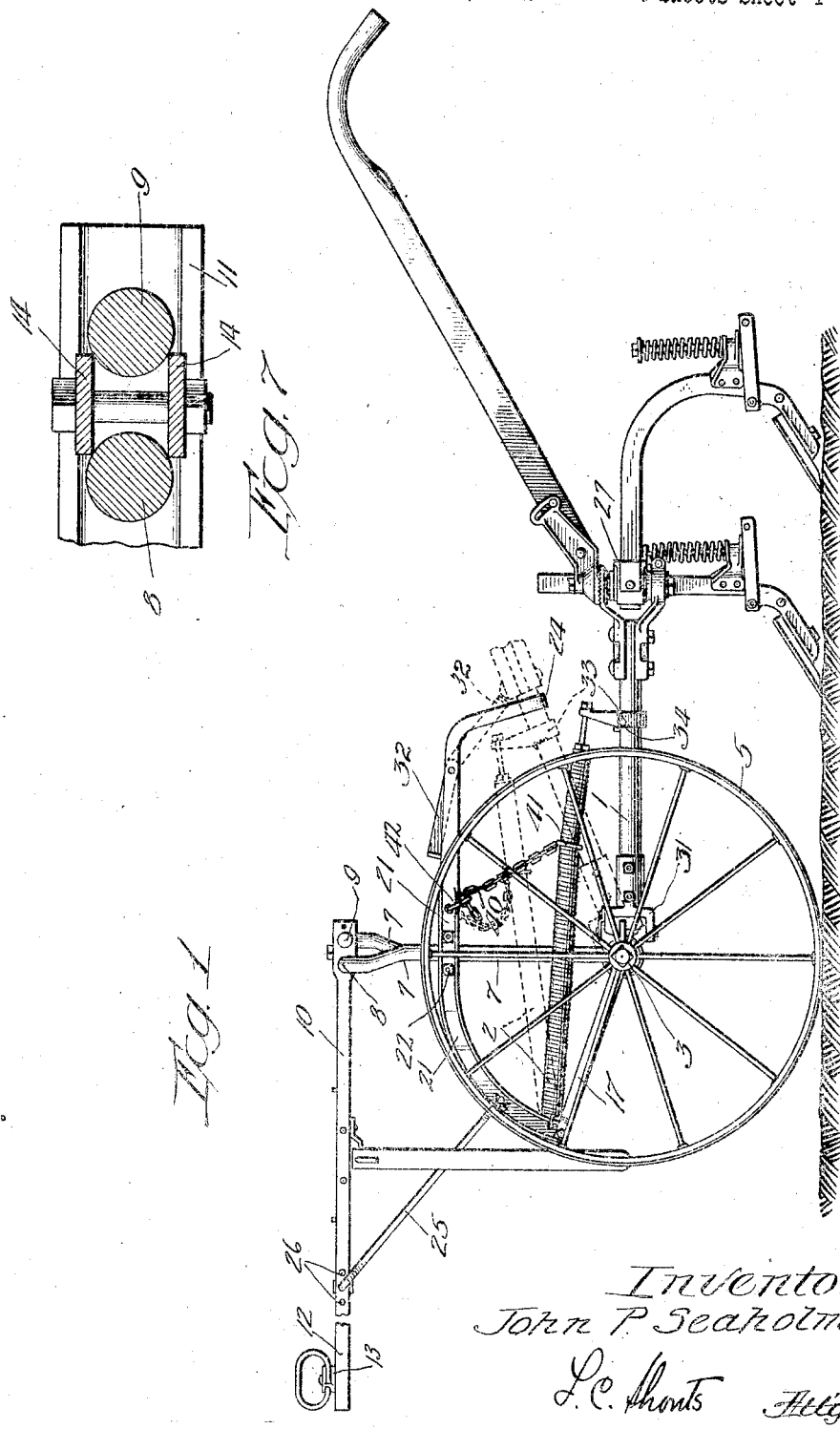

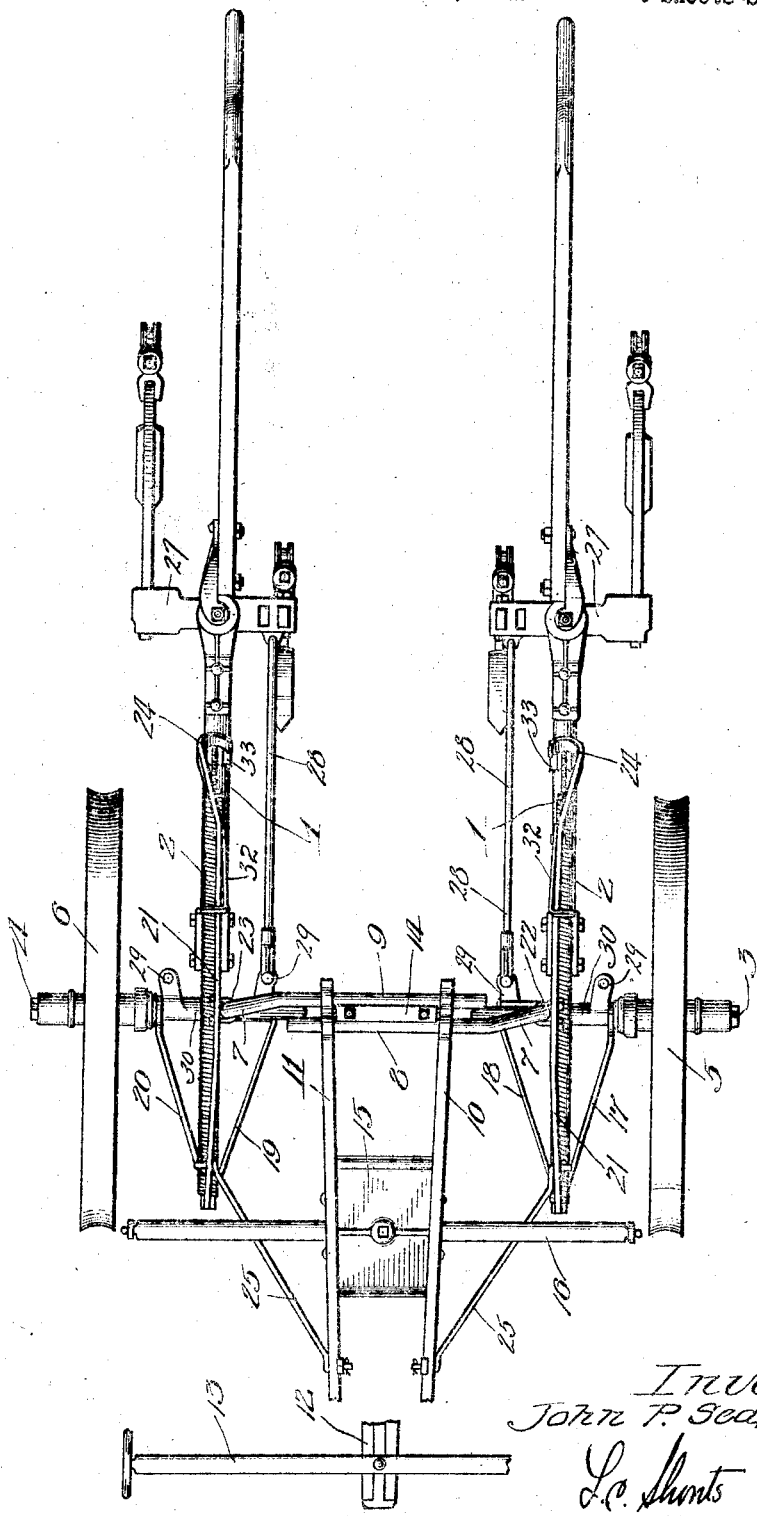

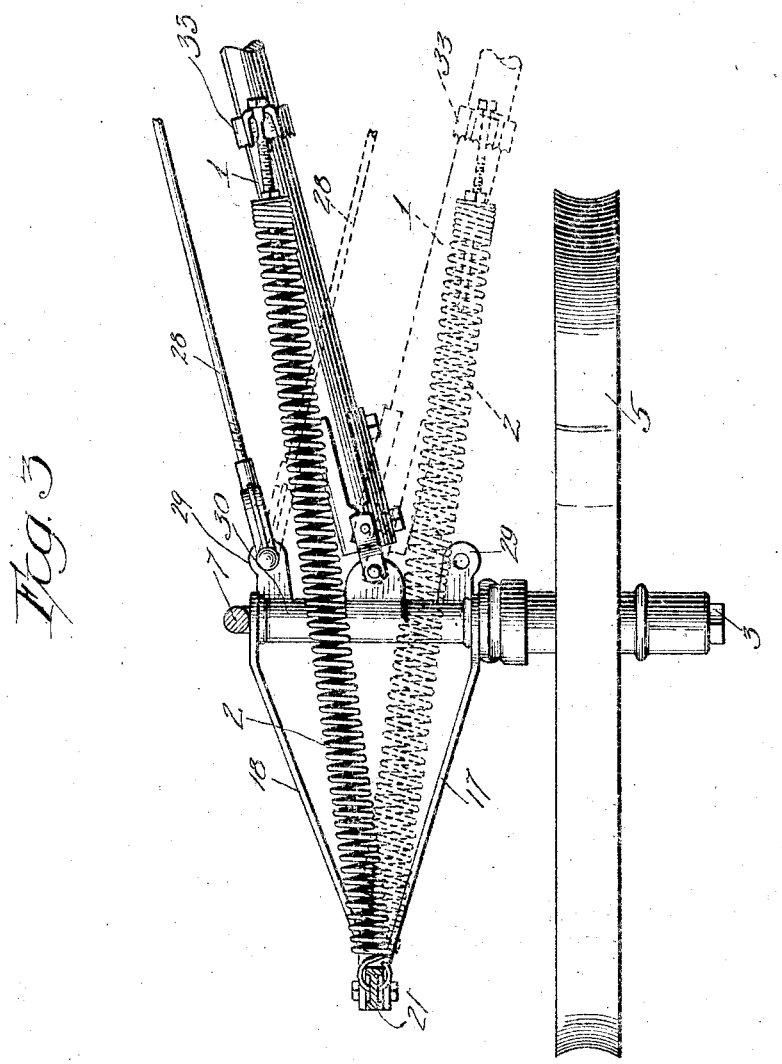

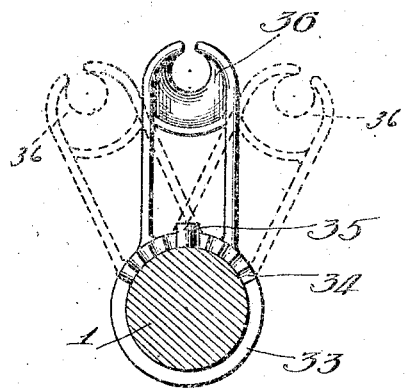
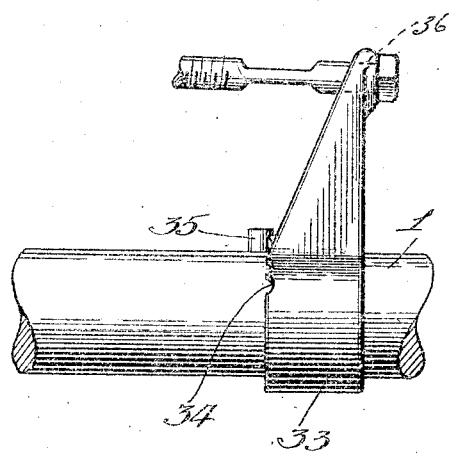
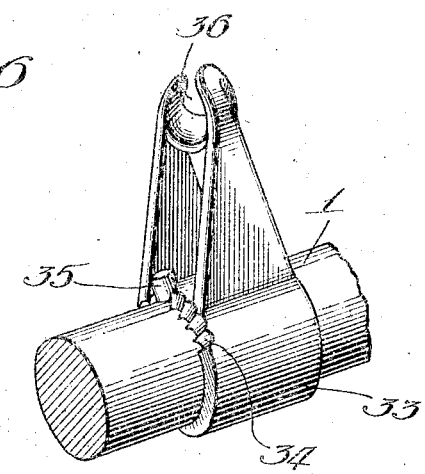

1,526,873

UNITED STATES PATENT OFFICE.

JOHN P. SEAHOLM, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

CULTIVATOR.

Application filed February 9, 1922. Serial No. 535,127.

*To all whom it may concern:*

Be it known that I, JOHN P. SEAHOLM, a citizen of the United States, residing at 1138 14th St., Moline, county of Rock Island, State of Illinois, have invented certain new and useful Improvements in Cultivators, of which the following is a specification.

The invention relates to cultivators.

The general object of the invention is to provide a simple, efficient cultivator that can be inexpensively produced.

A further object is to provide a cultivator having means for assisting the operator in holding the tillage tools to one side of the line of draft when such position is necessary during operation.

Other objects and advantages of the invention will appear from the specification and drawings.

An embodiment of the invention is illustrated in the drawings in which,

Figure 1 is a side elevation of the cultivator showing the drag bar in full lines in its lowered position and partly in dotted lines in its raised position.

Figure 2 is a plan view of the cultivator.

Figure 3 is a partial plan view of the cultivator showing particularly the means associated with the drag bar for balancing it and for biasing it to either the right or left of the line of draft.

Figure 4 is a detailed view showing an end elevation of an adjustable connection for the balancing spring of the cultivator.

Figure 5 is a side elevation of the connection illustrated in Figure 4.

Figure 6 is a perspective view of the connection illustrated in Figure 4.

Figure 7 is a detailed cross section showing the clamp for holding the axle in place.

The cultivator comprises, in general, a wheeled frame, of special construction having a pair of drag bars 1 and means comprising springs 2 for balancing and biasing the drag bars as will be hereinafter described.

The frame includes a pair of crank axles 3 and 4 which support on their lower wrist portions, the wheels 5 and 6. The vertical portions 7 of these axles are bent outwardly, that is, (see Fig. 2) the axles first rise vertically a short distance from the crank wrists, are then inclined outwardly toward the wheels after which they again rise vertically and are bent inwardly, terminating in horizontal portions 8 and 9. This shape for the crank axles provides an opening through the center of the cultivator which is wider at the top than at the bottom, thereby giving the cultivator more room to clear crops having bushy tops such as cotton and corn.

The horizontal portions 8 and 9 of the axles are substantially parallel and extend through openings in the separated ends of two tongue members 10 and 11, which converge forwardly to a point 12 to form the cultivator tongue to which is connected a neck yoke 13. The members 10 and 11 are braced near their rear ends by a metal tool box 15 which also serves to support a doubletree 16. The parallel horizontal ends of the axles are clamped together by means of a clamp 14, illustrated in detail in Figure 7, comprising two flat bars connected by bolts. This clamp prevents weaving or lateral displacement of the axles. By loosening the clamp, the axles may be moved laterally in the holes in the members 10 and 11 to increase or decrease the width of the machine.

Extending forwardly from the wrist portions of the crank axles are converging braces 17 and 18, and 19 and 20, respectively, which are connected together at their forward ends, and also connected to braces 21 extending upwardly and rearwardly and connected to the vertical portions of the crank axles by clamps 22 and 23. The rear ends of the braces 21 are bent downwardly to form hooks 24 for the reception of the drag bars 1 when they are elevated to inoperative position for transportation purposes. Braces 25 connect the braces 21 with the tongue members 10 and 11, these braces serving to hold the axles and the structures carried by them in proper angular relation to the tongue or, in other words, they connect the parts so as to combine them into a rigid framework. A plurality of holes 26 are provided in the tongue members 10 and 11 so that the point of connection of the braces 25 may be varied in case the axles are separated or brought closer together for increasing or decreasing the width of the cultivator.

This combination construction produces a frame from a minimum number of parts. The axles and tongue, which perform their normal functions, are also utilized as a ground work for the frame, and the braces for connecting these parts together are so arranged that they serve a plurality of purposes thereby avoiding the necessity for numerous parts each acting in a single capacity. All parts are preferably made of metal, the tongue, neck-yoke and doubletree being made of channel iron and the axles from metal bars. The construction is simple and inexpensive but, at the same time, rigid and durable.

Not only does the shape of the crank axles provide a cultivator having a good center clearance, but the position of the braces 18 and 19 also serves to gather and lift fallen plants, such as corn stalks and guide them through the center of the cultivator. If these braces were absent, or, if they were not shaped substantially as illustrated, there would be a tendency for the fallen plants to catch on the cultivator and be broken off. The forward ends of the braces are widely separated so that they can easily gather in the plants and gently guide them toward the large opening where they easily clear the cultivator.

The drag bars 1 carry shovel brackets 27 which are pivoted to the bars to swing about vertical axes. A link 28 is pivoted to each bracket and to a projection 29 on sleeves 30 mounted on the crank axle wrists, the links being substantially parallel to the drag bars. Each drag bar is pivoted to the sleeves 30 by a connection 31 which permits it to swing in a horizontal plane, movement in a vertical plane being obtained by rotation of the sleeves 30 on the axles. The function of the links 28 is to maintain the shovel brackets 26 and their shovels at right angles to the direction of travel of the cultivator when the drag bars are swung to one side or the other, such action being secured by the parallel link motion of the drag bars and links. It will be noted that there are projections 29 on each side of the point of connection of the drag bars to the sleeves 30. This makes the sleeves interchangeable and it also makes the drag bars interchangeable, that is, the right-hand drag bar in Figure 2 can be exchanged and mounted where the left one now is and vice versa.

The operative position of the drag bars is shown in full lines in Figure 1 and the inoperative position in dotted lines, the drag bars being supported in the latter position by the hooks 24. In order to prevent the drag bars from being jarred out of the hooks while the cultivator is being transported, latches 32 are provided which are pivoted to the braces 21. The latches have bent portions adapted to hook in behind the shovel-carrying brackets 27 on the drag bars as illustrated in Figures 1 and 2. The drag bars are thus locked against upward movement until the latches 32 are thrown backward to the full line position illustrated in Figure 1. This is a simple, yet effective construction, which secures a latching action with the addition of only one simple part, namely, the latch bent out of a strip of metal, the cooperating parts being elements that are necessary in the cultivator construction exclusive of the latch.

The springs 2 are connected to the forward part of the frame preferably at the juncture of the converging braces 17, 18, 19 and 20. These springs extend rearwardly past the pivot of the drag bars to the cultivator and are connected to the drag bars by means of an adjustable device 33 illustrated in detail in Figures 4, 5 and 6. When the drag bars are in the normal line of draft, that is, at substantially right angles to the cultivator axles, the springs 2 are directly over the pivots of the drag bars and they have no effective action in swinging the drag bars to either the right or left, but as soon as the drag bars are moved either to the right or left, the springs pass the centers of the pivots of the drag bars and immediately exert a biasing action which increases as the drag bar is moved away from the line of draft.

The purpose of this construction is to provide a means for assisting the operator in holding the shovels to one side of the line of draft. This is frequently necessary in cultivating, but becomes difficult and tiresome because the tendency of the draft is to pull the shovels and the drag bar back into the line of draft whenever an attempt is made to hold it to one side or the other. With the above construction, whenever the operator moves the drag bar to one side of the line of draft, he is assisted in holding it there by the tension of the spring, the effective force of which increases as the drag bar is moved farther out of the line of draft, and as the drag bar becomes harder to hold to its working position.

The adjustable connecting device 33 comprises a collar which is slideable and rotatable on the drag bar, the latter being illustrated as a cylindrical rod. The forward edge of the collar contains a plurality of serrations 34 which engage a pin 35 carried by the drag bar. The springs 2 are connected in notches 36 in the upper ends of arms carried by the collars. When it is desired to vary the effect of one of the springs 2, that is, when it is desired to make the spring bias the drag bar more to the right or left than to the left or right, the sleeve 33 is slid backward and rotated to shift the arm to the right or left, after which the collar is pushed back into contact with the pin 35, further rotation being prevented because of the serrations.

This adjustment has the added advantage that, by means of it, the tension of the springs may be utilized to maintain the drag bar in position when the shovels are set at an angle to hill the crops. For example, suppose the shovels are set to throw the dirt inwardly. In such case, the reaction tends to throw the drag bars outwardly, but by adjusting the collars so that their top portions are moved inwardly, the springs are brought into action to counteract the tendency of the drag bars to move outwardly. The operator is thus relieved of the constant strain of pushing inwardly on the drag bars. This adjustment can be made without destroying the usefulness of the spring in biasing the drag bar to the right or left when it is moved in either of these directions.

In addition to biasing the drag bars to the right and left, the springs 2 also serve to balance them in a vertical direction and to form adjustable stops for regulating the depth of cultivating.

The vertical balancing action is secured by reason of the fact that the springs are always under tension and, whenever the drag bars are lifted vertically a short distance above their working position, the leverage of the spring on the drag bar increases so that the force of the spring becomes increasingly effective to raise the drag bars. By properly choosing and adjusting the spring, the drag bars may be nicely balanced when in their operative position, and at the same time, the spring will act to gently raise the bars when the operator gives them a slight upward push toward inoperative position.

The depth regulation is secured by providing a connecting device 40 in the form of a chain fastened at one end to an adjustable clip 41 on the spring 2 and at its other end in a hook 42 on the brace 21. The length of the chain is such that, as the drag bar is lowered, the chain arrests the movements of the spring 2, which, in turn, arrests the downward movement of the drag bar. One position of the parts is illustrated in Figure 1. The depth to which the bar is lowered may be varied by varying the length of the chain 40 by changing the link which is hooked in the hook 42. The stop or depth regulator that is thus provided is a resilient one, that is, the portion of the spring 2 to the rear of the clip 41 permits the operator to push the drag bar and its shovels downwardly a limited amount, such action simply stretching that portion of the spring to the rear of the clip. This permits the operator to momentarily cultivate deeper than normally without losing the advantage of the initial adjustment.

The one spring accordingly performs four functions, that is, it balances the drag bars in a vertical direction; it also biases them to the right or left to assist the operator in holding the shovels out of the line of draft; it acts to hold the drag bar in position when the shovels are at an angle; and it serves as an adjustable resilient depth regulator. All these actions of the spring may be varied by simple adjusting means permitting quick manipulation.

From the above description and the drawings it will be appreciated that a cultivator construction has thus been provided which is extremely simple; one in which the various necessary parts are made to perform functions in addition to what they ordinarily perform; and one in which certain new functions are secured.

It will be understood that the structure shown is for purposes of illustration only and that variations may be made therein without departing from the spirit and scope of the appended claims.

I claim:

1. A cultivator having a wheeled frame, a tool supporting drag bar pivoted to said frame, a spring connected to a forward part of the frame and extending past the pivot, and means comprising a collar adjustable around the drag bar and having a serrated portion adapted to bear against a stop on the drag bar for varying the effective action of the spring in biasing the drag bar to the right or left when it is moved in either of these directions out of normal position.

2. A cultivator having a wheeled frame, a drag bar connected with the frame so that it may be swung in a vertical plane, a spring serving to balance the drag bar and to assist in raising it to transport position, and means associated with the spring for utilizing a portion of the spring to form a resilient stop permitting the drag bar to have a limited downward movement from its normal operating position.

3. A cultivator having a wheeled frame, a drag bar connected with the frame so that it may be swung in a vertical and in a horizontal plane, a spring serving to balance the drag bar, to assist in raising it, and to bias it in a horizontal direction when it is moved out of the line of draft, and means associated with the spring for causing it to act as a resilient stop to permit the drag bar to have a limited movement downwardly from its normal operating position.

4. A cultivator having ground wheels, an arched axle between the wheels, drag bars pivoted to said cultivator, a guiding pole, longitudinally extending bracing members connected to the sides of the arched axle, the rear ends of said braces forming supports for holding the cultivator drag bars in transport position, the front ends of said braces being connected to the guiding pole, springs connected to the front ends of said braces and extending rearwardly past the pivots of the drag bars, the rear ends of said springs being adjustably connected to said drag bars.

In testimony whereof, I affix my signature.

JOHN P. SEAHOLM.